United States Patent [19]

Tagami et al.

[11] Patent Number: 4,484,284
[45] Date of Patent: Nov. 20, 1984

[54] APPARATUS FOR VISUALLY INDICATING A CURRENT TRAVEL ROUTE OF A VEHICLE

[75] Inventors: Katsutoshi Tagami; Tsuneo Takahashi, both of Saitama; Shinichiro Yasui, Tokyo; Masao Sugimura, Saitama; Fumitaka Takahashi, Tokyo, all of Japan

[73] Assignee: Honda Giken Kogyo Kabushiki Kaisha, Tokyo, Japan

[21] Appl. No.: 298,629

[22] Filed: Sep. 2, 1981

[30] Foreign Application Priority Data

Sep. 4, 1980 [JP] Japan ................................ 55-122891

[51] Int. Cl.$^3$ .............................................. G06F 15/50
[52] U.S. Cl. ................................... 364/449; 364/424; 364/521; 343/451; 340/988; 340/995
[58] Field of Search ............... 364/443, 444, 449, 460, 364/559, 424, 520, 521; 340/23, 24, 27 NA, 988, 989, 990, 992, 995; 343/112 PT, 112 C, 450, 451; 73/1 E, 505, 516 LM, 497

[56] References Cited

U.S. PATENT DOCUMENTS

| | | | |
|---|---|---|---|
| 2,855,495 | 10/1958 | Grant | 73/497 |
| 3,631,729 | 1/1972 | Moore | 73/516 LM |
| 3,899,769 | 8/1975 | Honore et al. | 340/24 |
| 4,071,895 | 1/1978 | Wood et al. | 364/449 |
| 4,084,241 | 4/1978 | Tsumura | 364/460 |
| 4,086,632 | 4/1978 | Lions | 364/521 |
| 4,348,900 | 9/1982 | Takahashi et al. | 73/505 |
| 4,408,490 | 10/1983 | Takahashi et al. | 73/497 |

Primary Examiner—Gary Chin
Attorney, Agent, or Firm—Irving M. Weiner; Pamela S. Burt; Anthony L. Cupoli

[57] ABSTRACT

A visual travel route indicating apparatus for use in an automotive vehicle. The apparatus comprises a distance sensor for detecting a current distance of travel of the vehicle, a gas rate sensor for detecting a current azimuthal deviation generated during travel of the vehicle, a closed thermostatic chamber for hermetically enclosing the gas rate sensor such that it is isolated from external temperature fluctuations, and a signal processing unit for arithmetically obtaining a current location or point plotted on two-dimensional coordinates per a given unit travel distance from the outputs of the two sensors. A travel path store is provided for storing the thus-obtained data so as to be read out subsequently for a continuous visual indication of a current path of travel or locus of the vehicle on a display unit for visually indicating a continuous path of travel of the vehicle. A manual operating unit is provided for setting and modifying the visual indication pattern to be displayed on the display unit. The closed thermostatic chamber is positively heated to a desired constant temperature level by a suitable heater so that the gas rate sensor may be protected from a possible temperature fluctuation in the external environment.

5 Claims, 3 Drawing Figures

APPARATUS FOR VISUALLY INDICATING A CURRENT TRAVEL ROUTE OF A VEHICLE

BACKGROUND OF THE INVENTION

1. Field of the Invention

The present invention relates generally to a visual travel route indicating apparatus for use in a vehicle. More particularly, the invention relates to a visual travel route indicating apparatus, for use in an automotive vehicle or the like, which is specifically designed to visually display combined information on a current status of travel of the vehicle, such as a current location, a path of travel, a travel direction, etc.

2. Description of Relevant Art

In attempts to prevent the driver of an automotive vehicle or the like from losing his way while driving such as at night or in unfamiliar surroundings away from his desired route of travel, there have been developed a variety of devices which are designed to provide continuously or discretely a due current position or similar information on the vehicle by way of an indication panel or display screen including a related road map or the like disposed at the driver's seat so that he may receive a suitable ready guidance relating to the vehicle's current status of travel with respect to a desired course of travel.

In the conventional travel route indicating devices for application as described above, a current travel distance of a vehicle is detected in accordance with its travel speed and time by a distance detecting unit, a current bearing and a current amount of azimuthal deviation of the vehicle are detected by a rate type bearing detecting unit adapted to detect a possible angular velocity as produced about the axis of yawing of the vehicle, a current location of the vehicle along its travel route is obtained from an arithmetic operation on the thus-detected location data, and the results of such operation are indicated by way of spot information, changing from time to time as the vehicle progresses in its travel, on a display which visually indicates a suitable road map of routes on which the vehicle is to travel.

In the conventional devices described hereinabove, a terrestrial magnetism compass and a gyroscope are most commonly employed as the means for detecting a bearing or azimuthal deviation. However, because the device employing a terrestrial magnetism compass is susceptible to sources of magnetic disturbance such as steel rails, an iron bridge, etc., it is inevitable that the azimuthal deviation detected by such type of devices suffers from a substantial deviation in the indication of a travel path of a vehicle encountering such disturbance. Moreover, it is also impractical to install such devices in consideration of the vehicle's own magnetism environment. On the other hand, such a device employing a gyroscope cannot be relieved from an accumulated error in detection mainly because of its own drift which may be produced in operation. With such aforesaid devices, therefore, it is very possible that spot information showing a current location of the vehicle on the display would deviate from a predetermined course of travel, because of such errors in detection, to such an extent that such spot information would indicate an erroneous location of the vehicle on the display screen which may include a map of complicated and crowded roads and streets. As a consequence, therefore, it is very difficult, if not impossible, for the driver of the vehicle to determine whether the displayed information on the monitor screen of the display unit is erroneous or if the vehicle is actually travelling away from the desired course, thus resulting in substantial ambiguity.

The present invention effectively overcomes the aforesaid inconveniences and disadvantages attendant the conventional travel route indication apparatus.

SUMMARY OF THE INVENTION

The present invention provides a visual travel route indicating apparatus for use in a vehicle, the apparatus including distance sensor means for detecting a current travel distance of the vehicle and gas rate sensor means for detecting a current azimuthal deviation generated by the vehicle during turning operation. Signal processing means, which operatively cooperate with the distance and gas rate sensor means, are provided for arithmetically obtaining a current point plotted on two-dimensional coordinates per a given unit distance of travel of the vehicle in accordance with the output signal from each of the distance and gas rate sensor means. Display means, operatively cooperating with the signal processing means, are provided for visually indicating a current path of travel of the vehicle in accordance with location data on the two-dimensional coordinates, changing from time to time as the vehicle progresses in its travel, and obtained by the signal processing means.

It is a primary object of the present invention to provide an improved travel route indicating apparatus, for use in an automotive vehicle or the like, which provides a stable and precise visual indication of a current travel route of the vehicle on the display and which is effectively protected from disturbances such as terrestrial magnetism and ambient temperature changes.

It is another object of the invention to provide an improved visual travel route indicating apparatus, for use in an automotive vehicle, wherein there is provided a gas rate sensor having a strong resistance against mechanical vibrations and a high sensitivity in the detection of a current azimuthal deviation generated by the vehicle during turning operation away from its constant path of travel.

It is still another object of the invention to provide an improved visual travel route indicating apparatus, for use in an automotive vehicle, wherein a gas rate sensor is hermetically enclosed in the atmosphere within a closed thermostatic chamber which is effectively isolated from any disturbances caused by temperature changes in the ambient environment and which is positively heated to a desired constant temperature by way of a suitable heating means incorporated within the thermostatic chamber.

According to the present invention, there is provided an improved travel route indicating apparatus, for use in an automotive vehicle, which can provide not only a visual indication of a current location of the vehicle by way of spot information, but also a continuous visual indication of a path of travel of the vehicle for a given unit distance of travel from a predetermined reference point to a current location thereof. Even if the current location of the vehicle indicated visually on the display screen should deviate from the preselected course of travel on the road map or pattern on the display screen due to a possible error in detection as described hereinabove, it is feasible for the driver of the vehicle to refer the continuously indicated path of travel as thus indicated up to that moment of inspection to the pattern of roads on the map shown on the display unit, thus making it possible to readily determine which way the vehicle should travel.

More specifically, in accordance with the invention there is provided an improved travel route indicating apparatus, for use in an automotive vehicle, in which there is incorporated a gas rate sensor as rate type means for detecting an azimuthal deviation as detected about the axis of yawing of the vehicle, which sensor exhibits substantially more resistance against mechanical vibrations than the gyroscope and which presents a high sensitivity and a rapid response in detection. The gas rate sensor is generally designed for detecting a current angular velocity of the vehicle, generated by the vehicle during turning motion, by detecting a fractional amount of change in heat to be sensed by a gas flow sensor, which occurs in accordance with a current change in gas flow within the sensor from such an azimuthal change of the vehicle. In this connection, according to the present invention the gas rate sensor, which is substantially susceptible to disturbances such as an ambient temperature change, is enclosed in a specific structure which can effectively isolate any such external disturbances.

The above and further objects, details and advantages of the present invention will become more apparent from the following detailed description of a preferred embodiment of the invention, when read in conjunction with the accompanying drawings, wherein like parts are designated by like reference numerals.

DETAILED DESCRIPTION OF PREFERRED EMBODIMENTS

Figure 1:
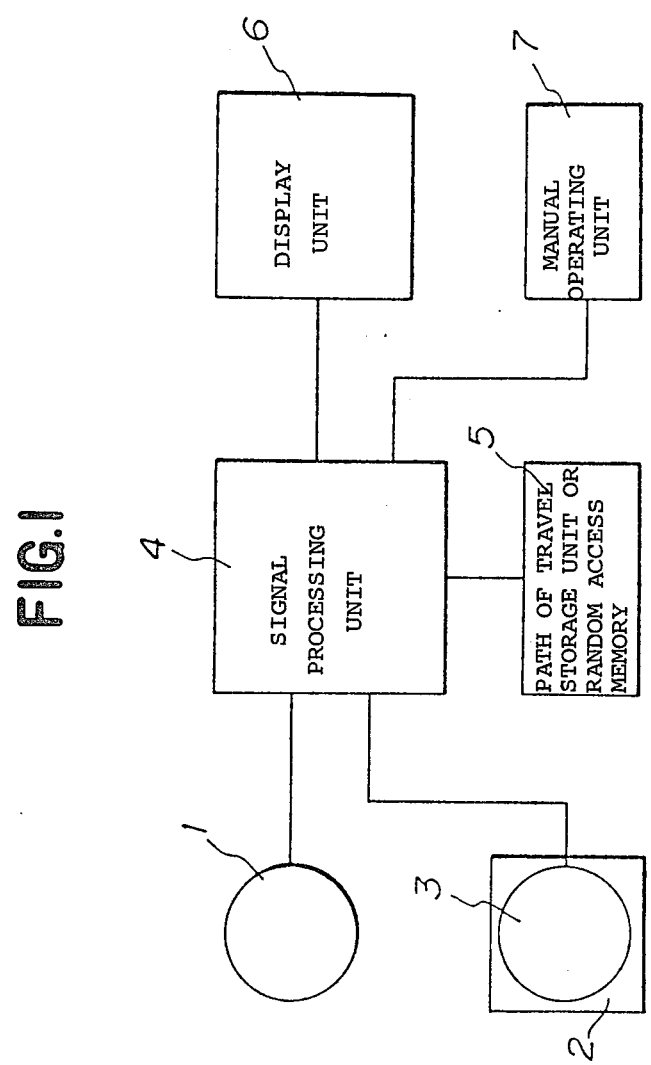
FIG. 1 is a schematic block diagram showing the general construction of a preferred embodiment of the visual travel route indicating apparatus according to the present invention.

With reference to FIG. 1, there is schematically shown the general construction of a travel route indicating apparatus according to the present invention. A distance detecting unit 1 is adapted to generate an electrical signal corresponding to a current travel distance of a vehicle including a sensor of a photoelectric, electromagnetic or mechanical contact type for generating electrical pulses proportional to, for example, the number of revolutions of the wheel of the vehicle. A gas rate sensor 3 is incorporated within a thermostatic chamber 2 and is adapted to output an electrical signal proportional to a current bearing or azimuthal deviation of the vehicle as generated by the vehicle during turning motion with respect to a predetermined reference route; and a signal processing unit (CPU) 4 is adapted to count the electrical pulses from the distance detecting unit 1 so as to measure the current travel distance of the vehicle, determine the current travel direction of the vehicle from the output of the gas rate sensor 3, and also arithmetically obtain a current position or graphic point plotted on two-dimensional coordinates per the given unit distance of travel of the vehicle in accordance with the detection signals from both the distance detecting unit 1 and the gas rate sensor 3, while centrally controlling the entire apparatus. A path of travel storage unit or random access memory (RAM) 5 is adapted to sequentially store data on the discrete positions or spots as plotted on the two-dimensional coordinates, which vary from time to time as the vehicle progresses in its travel and are obtained by the signal processing unit 4, and thus hold the data as finite and continuous information on the positions corresponding to the current location of the vehicle. A display unit 6 includes a CRT display, a liquid crystal display, or the like, and is adapted to visually indicate information as updated from time to time, such as a current travel distance of the vehicle, a current travel direction and a time required in accordance with the output from the signal processing unit 4. A manual operating unit 7 is adapted to feed an indication command to the signal processing unit 4 and appropriately modify the settings such as of a directional change in the vehicle's travel path as visually indicated on the display unit 6, a shift in the position of such indication on the display, a fragmentary indication of the path of travel for inspection, a manual selection of a scale of indication, etc.

With the above-described arrangement of the vehicle travel route indicating apparatus in accordance with the present invention, the aforesaid advantages are effectively attained.

In operation, it is initially required prior to starting the vehicle to manually preset a predetermined starting or reference point of the vehicle motion as well as a desired scale of visual indication on the monitor screen of the display unit 6 in accordance with the road map displayed thereon by sending an indication command through the manual operating unit 7. After such procedures, and once the vehicle has begun to move, a single electrical pulse signal is sent from the distance sensor 1 to the signal processing unit 4 at an interval of a given unit distance of travel of the vehicle, where the number of pulses thus fed thereto is counted so as to measure a current travel distance of the vehicle, while also sending the output from the gas rate sensor 3 to the signal processing unit 4, where a current cruising direction or azimuth of the vehicle at each moment for such an interval may be determined as desired. At this moment, because the gas rate sensor 3 is hermetically isolated within the thermostatic chamber 1 in which the atmosphere is held at a predetermined constant temperature, the gas rate sensor 3 is now prepared to precisely detect a current angular velocity about the yawing axis of the vehicle as generated by the vehicle during turning motion (if any), free from any disturbances caused by a possible change of the external ambient temperature. The signal processing unit 4 now operates, as described hereinabove, to arithmetically obtain from time to time a current location or graphic point (x, y) of the vehicle plotted on the X-Y coordinates on the preselected scale of indication in accordance with the current travel distance and azimuthal deviation of the vehicle which has been detected in the manner as described hereinabove, the results of which operation are then sent and stored in sequence at the travel path storage unit 5. The thus-stored contents may normally be read out so as to be continuously fed into the display unit 6 for being displayed thereby. At the same time, an azimuthal signal taken at a current location of the vehicle is sent out in sequence from the signal processing unit 4 to the display unit 6.

Figure 2:
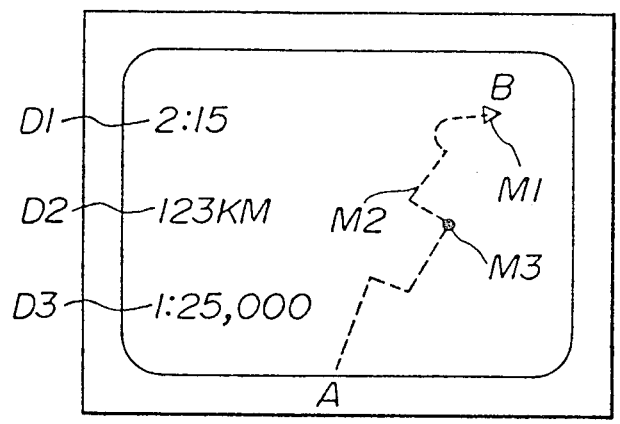
FIG. 2 is a schematic view showing a typical visual indication of a current travel route and bearing status of the vehicle on the display screen of the visual travel route indicating apparatus shown in FIG. 1.

More specifically, as shown in FIG. 2, a visual indication on the display unit 6 is performed in such a manner that there is visually shown an azimuthal indication mark M1 appearing at the current location B of the vehicle and a path of travel indication mark M2 showing the current path of travel from the predetermined starting or reference point A over to the current location B of the vehicle in a simulated manner so as to follow the current travel route of the vehicle. In this connection, for the purpose of verifying whether or not the path of travel of the vehicle up to a current point of time complies with the desired path at any moment while driving, a retrieval mark M3 may be placed anywhere along the path of travel indication mark M2 indicated on the display unit 5 by an arbitrary manual operation on the manual operating unit 7.

On the other hand, the display unit 6 is also arranged, as shown in FIG. 2, so that there may be indicated additional auxiliary indication in accordance with the signals as supplied from the signal processing unit 4, such as an indication of time D1 which is required for travel, for instance, from a predetermined reference point to the current location B (which may be implemented by use of a suitable timer incorporated within the signal processing unit 4 which operates only during the time interval that the vehicle is moving), as well as an indication of the current total mileage D2 up to location B, or an indication of display scale D3 selected by way of the manual operating unit 7 as desired.

With the aid of the indication on the display unit 6 as described hereinabove, the driver of the vehicle is able to readily and positively identify in which way his vehicle is cruising by way of a due reference of a current path of travel as visually indicated upon the monitor screen of the display unit 6 to the patterns of a road on the map shown on the display screen thereof. Even if there has been an accumulated error in indication from relatively long travel of the vehicle up to the moment of inspection by the driver, when a part of the path of travel is specifically compared with reference to a corresponding pattern of a road to be travelled by the vehicle where there is a particular distinguishing feature such as the last curve as typically shown in FIG. 2, only a current accumulated error after that particular pattern of road is to be noted, thus enabling the driver of the vehicle to determine his location at this moment more accurately, yet with easy approximation.

In addition, by virtue of the advantageous feature of the invention wherein the very path of travel of the vehicle is held continuously in the visual indication for a given extension or zone that has been passed by the vehicle, it is concurrently possible for the driver to determine the general deviation in the actual travel of his vehicle (if any), in terms of either distance or orientation away from the desired or predetermined path of travel. Also, it is possible for the driver to determine a current location of the vehicle more efficiently and positively by changing the scale of indication of the path of travel on the display screen, justifying the thus-obtained indication upon the due course of travel on the map indicated on the display screen, selectively rotating the orientation of the indication on the display to suit the current direction of cruising, or partially enlarging the particular points passed by the vehicle as desired.

Figure 3:
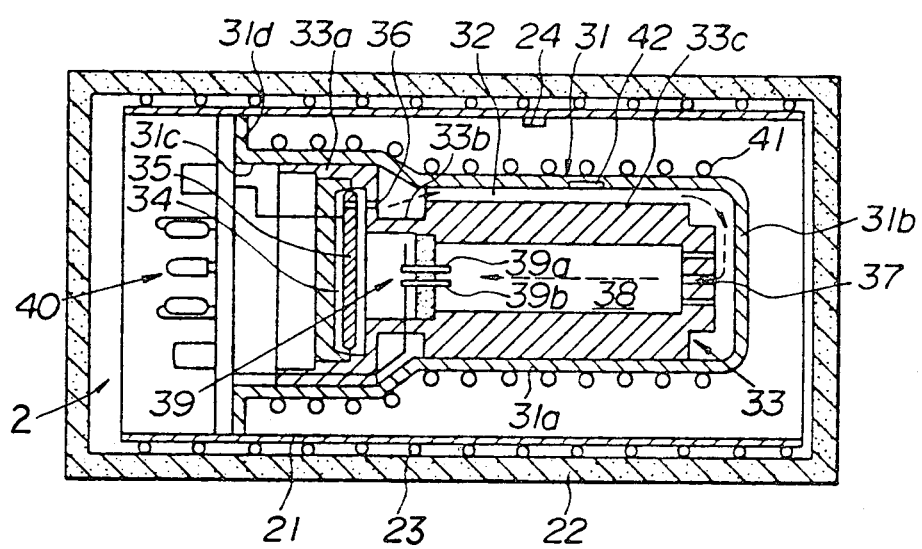
FIG. 3 is a vertical cross-sectional view showing a preferred embodiment wherein there is provided a thermostatic control chamber and a gas rate sensor enclosed therewithin.

With reference to FIG. 3, there is shown a preferred embodiment of the construction of the thermostatic chamber 2 designed to enclose the gas rate sensor 3 therein, in accordance with the invention.

More specifically, there is shown in cross-section a casing 31 for the gas rate sensor 3, the casing 31 including a hollow cylindrical body 31a, one end of which body is closed with an end plate 31b. The cylindrical body 31a has an opposite end opening 31c, provided with an annular flange 31d therearound.

The transverse cross-sectional shape of the cylindrical body 31a is not shown particularly, but is generally formed with three ledges extending radially internally from three equally-spaced points on the circumference thereof, a flow passage 32 being formed between the adjacent ledges in the axial direction.

With such construction of the casing 31, a sensor 33 may be completely inserted into the hollow central body 31a as shown in cross-section in FIG. 3. The complete sensor 33 comprises a holder portion 33a, a neck portion 33b and a cylinder portion 33c, the holder portion 33a being provided with a pump chamber 34 therein. In pump chamber 34 there is provided a piezoelectric plate 35 which functions as a pump element so as to compress a gas within the pump chamber 34. The thus-compressed gas is then discharged out of an outlet 36 so that it may circulate in the axial direction along the flow passage 32 around the outer circumference of the cylinder portion 33c. On the other hand, there is provided a nozzle hole 37 at the leading end of the cylinder portion 33c, the nozzle hole 37 communicating with the inner flow passage 38, and there are further installed temperature-sensing elements 39a, 39b adapted to form a flow sensor 39 at the end of the inner flow passage 38. With such construction, the gas forced from the pump chamber 34 through the outlet 36 to the passage 32 outside the cylinder portion 33c is then directed into the inner flow passage 38 through the nozzle hole 37, and is then ejected toward the temperature sensing elements 39a, 39b. At the moment that there occurs an external angular momentum upon the gas rate sensor as thus constructed, the gas flow is deflected within the inner passage 38 in such a manner as to cause the output of the flow sensor element 39 to be changed, the thus-produced fractional change in the flow sensor output being amplified through an amplifier 40 and then delivered externally.

According to the present invention, the casing 31 is provided with first heating means in the form of a helical coil of sheathed heating wire 41 therearound, so that the casing 31 may be heated when power is supplied thereto. The temperature of the atmosphere within the casing 31 can be regulated as desired by the function of the sheathed heating wire 41. More specifically, it is preferable to provide a temperature sensor 42 within the casing 31 so that the temperature in the casing 31 may be controlled at a desired constant level through the on/off control rendered by the sensor 42.

There is also provided a holding cylinder 21 outside the casing 31, around which there is further provided an outer housing 22 which is made of an insulating material.

A second heating means comprising a sheathed heating wire 23 in the form of a helical coil is disposed in the gap between the holding cylinder 21 and the outer housing 22. With respect to the sheathed heating wire 23, there is preferably provided a temperature sensor 24 mounted, for instance, within the holding cylinder 21 for the purpose of the on/off control of the heating wire 23 so that the temperature of the atmosphere within the outer housing 22 may be maintained at a constant temperature in order to attain a more precise temperature control.

The atmospheric temperature (Tc) in the casing 31 and the atmospheric temperature ($T_H$) in the outer housing 22 may selectively be maintained at a desired setting point, respectively, by means of the sheathed heating wires 41 and 23. More specifically, according to a preferred embodiment of the invention wherein such temperature gradient as $Tc > T_H$ is given, it is advantageous that an extra cushioning effect can be assured against occasional changes in the external temperature surrounding the outer housing 22.

In this manner, by virtue of the arrangement according to the present invention wherein the temperature of the atmosphere within the casing may be maintained at a constant level by the sheathed heating wires installed helically around the outer circumference of the casing in which the complete sensor is incorporated, it is possible to assure a highly precise detective performance of the gas flow sensor by effectively isolating its output from any disturbances which may result from a change in the ambient temperature.

As described hereinabove, according to the present invention there is provided an improved visual travel route indicating apparatus of the type comprising a distance sensor adapted to detect a current travel distance of a vehicle such as an automotive vehicle, a gas rate sensor incorporated within a thermostatic chamber and adapted to detect an azimuthal deviation generated by the vehicle during turning motion, a signal processing unit adapted to arithmetically obtain a current graphic point on two-dimensional coordinates per a given unit distance of travel of the vehicle in accordance with the outputs from these sensors, a travel path storage unit adapted to sequentially store the thus-obtained location data in terms of the two-dimensional coordinates so as to hold the contents of such continuous location information on the vehicle, a display unit adapted to continuously indicate the current travel route of the vehicle in accordance with the thus-stored data in the storage unit, and a manual operating unit adapted to set and modify a visual indication of such location data of the vehicle. There is thus attained the uniquely advantageous features of enabling the driver of the vehicle to constantly ascertain the current status of travel of the vehicle in a precise manner, free from any disturbances caused by a change in external temperature.

It is clear from the foregoing description that the various objects set forth hereinabove are efficiently attained by the present invention, and because various changes and modifications may be made therein without departing from the spirit and scope of the invention it is intended that the foregoing description including the accompanying drawings should be interpreted as illustrative, and not restrictive. The scope of the invention is indicated by the appended claims rather than by the foregoing description.

We claim:

1. A visual travel route indicating apparatus for use in a vehicle, comprising:
   distance sensor means for detecting a current travel distance of said vehicle;
   gas rate sensor means for detecting a current azimuthal deviation generated by said vehicle during turning operation;
   said gas rate sensor means being isolatedly enclosed in an atmosphere within thermostatic chamber means;
   said thermostatic chamber means comprising a casing having said gas rate sensor means disposed therein and provided with first heating means, and an outer housing having said casing disposed therein and provided with second heating means;
   signal processing means, operatively cooperating with said distance and gas rate sensor means, for arithmetically obtaining a current point plotted on two-dimensional coordinates per a given unit distance of travel of said vehicle in accordance with the output signal from each of said distance and gas rate sensor means; and
   display means, operatively cooperating with said signal processing means, for visually indicating a current path of travel of said vehicle in accordance with location data on the two-dimensional coordinates, changing from time to time as the vehicle progresses in its travel, and obtained by said signal processing means.

2. A visual travel route indicating apparatus according to claim 1, wherein:
   said location data on said two-dimensional coordinates, changing from time to time as the vehicle progresses in its travel and obtained by said signal processing means, is stored in sequence;
   the contents of said location data are held as continuous information on a current location of said vehicle by travel path store means; and
   a continuous path of travel of said vehicle is visually displayed in accordance with said location data thus held in said store means on said display means.

3. A visual travel route indicating apparatus according to claim 2, further comprising:
   manual operating means for setting and modifying the visual indication pattern to be displayed on said display means.

4. A visual travel route indicating apparatus according to claim 1, wherein:
   said first heating means comprises a heating wire in the form of a helical coil disposed around said casing so as to heat the atmosphere within said casing.

5. A visual travel route indicating apparatus according to claim 4, wherein:
   a holding cylinder is outside said casing and within said outer housing; and
   said second heating means comprises a second heating wire in the form of a helical coil disposed in a gap defined between said holding cylinder and said outer housing so as to heat the atmosphere within said outer housing.

* * * * *